US012037101B2

(12) United States Patent
Haserodt et al.

(10) Patent No.: US 12,037,101 B2
(45) Date of Patent: Jul. 16, 2024

(54) DRIVE SYSTEM WITH INTEGRATED TORQUE SENSING DEVICE

(71) Applicant: Airbus Operations GmbH, Hamburg (DE)

(72) Inventors: Jan Haserodt, Bremen (DE); Christoph Winkelmann, Buchholz (DE); Andreas Fleddermann, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 199 days.

(21) Appl. No.: 17/714,534

(22) Filed: Apr. 6, 2022

(65) Prior Publication Data

US 2022/0324551 A1    Oct. 13, 2022

(30) Foreign Application Priority Data

Apr. 7, 2021 (DE) .......................... 102021108692.2

(51) Int. Cl.
*B64C 13/28* (2006.01)
*B64C 9/14* (2006.01)
(Continued)

(52) U.S. Cl.
CPC ............... *B64C 13/28* (2013.01); *B64C 9/14* (2013.01); *F16D 41/02* (2013.01); *F16D 47/02* (2013.01); *B64D 2045/001* (2013.01)

(58) Field of Classification Search
CPC ............... B64C 13/28; B64D 45/0005; B64D 2045/001; B64D 2045/0085; F16D 43/21;
(Continued)

(56) References Cited

U.S. PATENT DOCUMENTS 4,762,205 A * 8/1988 Ortman ................... F16D 59/00
                                                       188/82.5
5,655,636 A * 8/1997 Lang ....................... B64C 13/28
                                                       188/134
(Continued)

FOREIGN PATENT DOCUMENTS

DE     10 2012 020 820        4/2014
DE     10 2013 206 059       10/2014
(Continued)

OTHER PUBLICATIONS

German Search Report for Application No. DE 102021108692.2, dated Nov. 10, 2021, 6 pages.

*Primary Examiner* — Christopher D Hutchens
*Assistant Examiner* — Michael A. Fabula
(74) *Attorney, Agent, or Firm* — Nixon & Vanderhye P.C.

(57) ABSTRACT

A drive system for driving a movable flow body having a drive unit, a shaft, a torque sensing device, a no-back friction unit, and an axial bearing. The drive unit is coupled with the shaft to rotate the shaft, the torque sensing device is coupled with at least one of the drive unit and the shaft to detect a torque transferred from the drive unit into the shaft, the no-back friction unit is arranged between the axial bearing and an axial support means of the shaft, such that an axial load of the shaft is supported by the axial bearing, and the no-back friction unit is configured to substantially not counteract a rotation of the shaft in a first direction of rotation of the shaft and to apply a friction-induced additional torque to the shaft in an opposite second direction of rotation.

16 Claims, 1 Drawing Sheet

(51) Int. Cl.
*F16D 41/02* (2006.01)
*F16D 47/02* (2006.01)
*B64D 45/00* (2006.01)

(58) Field of Classification Search
CPC ...... F16D 43/213; F16D 43/215; F16D 41/02; F16D 47/02; F16D 7/02; F16D 7/025
See application file for complete search history.

(56) References Cited

U.S. PATENT DOCUMENTS

| | | | | |
|---|---|---|---|---|
| 5,743,490 | A * | 4/1998 | Gillingham | B64D 45/0005 244/213 |
| 6,824,099 | B1 * | 11/2004 | Jones | B64C 13/28 244/99.2 |
| 7,690,597 | B2 * | 4/2010 | Cavalier | F16H 25/2454 244/99.2 |
| 8,146,858 | B2 * | 4/2012 | Port-Robach | F16H 25/2454 192/223.1 |
| 8,393,568 | B2 * | 3/2013 | Maresko | B64C 9/02 244/99.2 |
| 8,646,726 | B2 * | 2/2014 | Manzanares | F16H 25/2454 192/223.1 |
| 9,863,515 | B2 * | 1/2018 | Bernard | B64C 13/341 |
| 10,234,012 | B1 * | 3/2019 | Latif | F16H 25/2204 |
| 10,288,502 | B1 * | 5/2019 | Ankney | B64F 5/60 |
| 10,443,696 | B1 * | 10/2019 | Latif | B64C 5/02 |
| 11,407,495 | B2 * | 8/2022 | Winkelmann | B64C 9/24 |
| 2003/0062890 | A1 * | 4/2003 | Tokumoto | G01L 3/104 324/207.25 |
| 2008/0000730 | A1 * | 1/2008 | Port-Robach | B64C 13/28 244/99.2 |
| 2010/0001125 | A1 * | 1/2010 | Cavalier | F16H 25/2454 244/99.3 |
| 2011/0006154 | A1 * | 1/2011 | Maresko | B64C 9/02 244/99.2 |
| 2013/0313067 | A1 * | 11/2013 | Finney | F16D 67/02 192/223.2 |
| 2015/0018155 | A1 * | 1/2015 | Gitnes | F16H 35/10 475/263 |
| 2016/0016653 | A1 * | 1/2016 | Barger | B64C 13/28 192/223 |
| 2016/0369877 | A1 * | 12/2016 | Gitnes | F16H 25/2454 |
| 2017/0233095 | A1 * | 8/2017 | Baines | B64C 9/16 244/99.3 |
| 2018/0194454 | A1 * | 7/2018 | Olson | B64C 5/02 |
| 2018/0231425 | A1 * | 8/2018 | Raths Ponce | G01L 3/105 |
| 2018/0273199 | A1 * | 9/2018 | Harrington | B64C 9/16 |
| 2018/0355921 | A1 * | 12/2018 | Cristina | F16D 7/10 |
| 2019/0063520 | A1 * | 2/2019 | Gianfranceschi | F16D 55/38 |
| 2019/0092491 | A1 * | 3/2019 | Harrington | G07C 5/085 |
| 2019/0120349 | A1 * | 4/2019 | Curtis | F16H 25/2454 |
| 2019/0337635 | A1 * | 11/2019 | Ankney | B64D 45/0005 |
| 2020/0011750 | A1 * | 1/2020 | Ankey | B64C 9/02 |
| 2020/0324872 | A1 * | 10/2020 | Trenkle | B64C 3/38 |
| 2020/0324879 | A1 * | 10/2020 | Trenkle | B64C 13/34 |
| 2021/0061445 | A1 * | 3/2021 | Winkelmann | B64C 9/24 |
| 2021/0071461 | A1 * | 3/2021 | Pandian | F16D 67/02 |
| 2021/0071742 | A1 * | 3/2021 | Huynh | F16H 25/2204 |
| 2021/0237906 | A1 * | 8/2021 | Buenvenida | B64D 43/00 |
| 2022/0185448 | A1 * | 6/2022 | Rozeboom | B64F 5/60 |
| 2022/0228934 | A1 * | 7/2022 | Kakaley | G01L 3/104 |

FOREIGN PATENT DOCUMENTS

| | | | |
|---|---|---|---|
| DE | 10 2013 206 060 | 10/2014 | |
| EP | 0 901 960 | 3/1999 | |
| EP | 0 988 226 | 3/2000 | |
| EP | 2 955 104 | 12/2015 | |
| EP | 3450785 A1 * | 3/2019 | ............. B64C 13/28 |
| EP | 3643619 A1 * | 4/2020 | ......... B64D 45/0005 |
| WO | 98/56655 | 12/1998 | |
| WO | WO-2017148591 A1 * | 9/2017 | ............. B64C 13/38 |

* cited by examiner

DRIVE SYSTEM WITH INTEGRATED TORQUE SENSING DEVICE

CROSS REFERENCE TO RELATED APPLICATION

This application claims priority to and incorporates by reference the entirety of German Application Number DE 10 2021 108692.2, filed Apr. 7, 2021.

TECHNICAL FIELD

The invention relates to a drive system for driving a movable flow body, a high lift system having such a drive system, a wing, and an aircraft.

BACKGROUND OF THE INVENTION

High lift systems of aircraft are known that comprise ball screw actuators with an integrated no-back device and an arrangement of friction discs between a drive unit and a nut to be moved by the ball screw. During extension of a movable flow body the no-back device rotates the arrangement of friction discs without the friction discs rotating relative to each other and directly acts on the ball screw. During retraction, the no-back device blocks and the torque introduced into the ball screw needs to also work against the friction disc arrangement actively, i.e. the friction discs rotate relative to each other and provide a certain mechanical resistance. Such a design is a safety measurement to prevent the actuator from being pushed back by air loads in case of an unlikely transmission disconnect in the high lift system. In order to always maintain this safety measurement, the friction disc arrangement is required to be regularly inspected.

SUMMARY OF THE INVENTION

The invention contemplates an improved drive system for driving a movable flow body with a reduced need for inspection, while the level of safety is to be maintained or improved.

A drive system for driving a movable flow body is proposed, comprising a drive unit, a shaft, a torque sensing device, a no-back friction unit, and an axial bearing, wherein the drive unit is coupled with the shaft to rotate the shaft, wherein the torque sensing device is coupled with at least one of the drive unit and the shaft to detect a torque transferred from the drive unit into the shaft, wherein the no-back friction unit is arranged between the axial bearing and an axial support means of the shaft, such that an axial load of the shaft is supported by the axial bearing, and wherein the no-back friction unit is designed to substantially not counteract a rotation of the shaft in a first direction of rotation of the shaft and to apply a friction-induced additional torque to the shaft in an opposite second direction of rotation.

The drive system according to the invention is thus based on the drive system briefly introduced in the background section. The drive unit may comprise any device that is capable of providing a rotation. For example, the drive unit may be realized by a transmission shaft system driven by a central motor, such as a power control unit. Other variants, which may comprise locally arrangeable motors, are of course possible.

The shaft may be a part of a ball screw, it may be coupled with such a ball screw or it may belong to another device that translates a rotational motion into a linear motion. The ball screw comprises a thread that is designed to provide a relative axial motion between the ball screw and the ball screw nut upon rotation of the ball screw. If the ball screw is axially fixed and rotatably supported, the ball screw nut moves in an axial direction if its rotation is prevented. Thus, by rotating the shaft, the ball screw nut moves along an axial direction and extends or retracts a flow body. However, other devices for translating a rotational motion into a linear motion are not ruled out.

The axial support means introduces axial forces into a structure using the axial bearing. Movable flow bodies that are extended into an airflow surrounding an aircraft are subjected to comparably high air loads that lead to axial forces. The axial bearing may be attached to the shaft and rest on a structural surface or vice versa.

The no-back friction unit is pressed towards the axial bearing through the axial support means. The no-back friction unit may comprise a no-back device, such as a one-way clutch. It furthermore comprises a friction device, which is coupled with the no-back device. They may be provided as a single component or an assembly of two components. The no-back friction unit is arranged between the axial bearing and the axial supported means and follows the rotation of the shaft as it is pressed towards the axial bearing by the axial support means. The no-back friction unit is designed in such a way that the drive unit and the shaft can freely rotate in the first direction of rotation to move the respective flow body only against the air loads. Additional forces from the no-back friction unit are prevented in this direction as the no-back friction unit may rotate as a whole or the friction device is deactivated in the first direction. In this case, a friction inside the no-back friction unit does not occur.

In the opposing second direction of rotation, a part of the no-back friction unit is held in a stationary position or urges into a stationary position through the no-back device, which is blocked or activated in the second direction. Thus, a friction-induced torque is generated and acts against the rotation of the shaft. Consequently, a certain torque is required to retract the respective flow body, which torque depends on the design of the friction device. By detecting the torque applied to the shaft it is possible to compare the actual torque with an expected torque. If a deviation between the measured torque and the expected torque exceeds a predetermined threshold the no-back device and/or the friction device obviously does not behave as expected and maintenance is to be provided. With this situation detected and with the remaining drive unit, as well as the shaft and a ball screw actuator or another actuating means, the respective flow surface will still be held in a safe condition. According to the invention, the integrity of the no-back device and/or the friction device is checked each time the respective flow body is retracted. In this way, dormant failures can reliably be prevented. Also, by integrating the no-back friction unit in the drive system, a wing tip brake would not be needed compared to other high lift system architectures, which aids in reducing weight and system complexity.

In an advantageous embodiment, the no-back friction unit comprises a one-way clutch and a friction disc device having a first friction disc and a second friction disc in friction contact, wherein the one-way clutch and the friction disc device are designed to mutually rotate the first friction disc and the second friction disc with the one-way clutch in the first direction of rotation of the shaft and to provide a relative rotation between the first friction disc and the second friction disc in the second direction of rotation. The friction disc device is pressed towards the axial bearing through the axial support means. Between the friction disc device and the axial bearing, the one-way clutch is arranged. The one-way clutch and the friction disc device are combined in such a way that the drive unit and the shaft can freely rotate in the first direction of rotation to move the respective flow body only against the air loads. Additional forces from the friction disc device are prevented in this direction as the one-way clutch rotates all of the friction discs together. In this case, they do not conduct a rotation relative to each other and thus do not generate a friction-induced torque acting against the rotation of the shaft. In analogy to the above, in the opposing second direction of rotation, a part of the friction discs is held through the blocked one-way clutch. Thus, a friction-induced torque acts against the rotation of the shaft through the relative motion between both friction discs.

Alternative solutions are possible. These may include e.g. skewed rollers. Also, coils wound around a shaft that tighten in the second direction of rotation and loosen in the first direction are conceivable.

In an advantageous embodiment the axial support means is a shoulder radially extending from the shaft. The shoulder may be a local radial protrusion in the form of a disc or a disc-like body having an outer diameter clearly exceeding the diameter of the adjacent parts of the shaft. As an alternative thereto, the shoulder may also be a simple step in the shaft where the shaft diameter changes. The shaft may thus be supported through resting the shoulder on the friction disc device, which in turn rests on the one-way clutch that acts on the axial bearing.

In an exemplary embodiment the one-way clutch comprises an inner clutch ring and an outer clutch ring, wherein the inner clutch ring is arranged between the friction disc device and the axial bearing. Advantageously, the inner ring and the friction disc device may roughly comprise the same diameter. For example, the outer diameter of the inner ring may be in a range of 75% to 125% of the outer diameter of the friction disc device or vice versa. At the same time, the axial support means, e.g. in the form of a shoulder, may comprise an annular surface that has an outer diameter that roughly corresponds to the outer diameter of the friction disc device. In analogy, the outer diameter of the axial support means may be in a range of 75% to 125% of the outer diameter of the friction disc device or vice versa. By this design, the axial bearing, the inner ring, and the friction disc device directly follow on each other and are exposed to the same axial force in a continuous direction of force.

In an advantageous embodiment the outer clutch ring is couplable with a fixed structural part to be immovable. The outer clutch ring thus arrests the inner clutch ring in the second direction. Resultantly, the friction disc device is arrested by the inner ring, which leads to a relative rotation between the first friction disc and the second friction disc during retraction of the respective flow body.

Advantageously, the first friction disc is coupled with the inner clutch ring. Thus, the first friction disc follows the motion of the inner clutch ring. If the one-way clutch is blocked, the inner clutch ring does not move relative to the outer clutch ring. Thus, the first friction ring also does not move relative to the outer clutch ring if the one-way clutch is blocked. This reliably prevents the movable flow body from an inadvertent motion.

The torque sensing device may advantageously be arranged upstream of the no-back friction unit. In this installation position it is capable of detecting any torque that is applied to the drive system.

In an exemplary embodiment, the torque sensing device comprises a load cell integrated into the shaft. This saves installation space and provides reliable results.

As indicated above it is advantageous if the shaft is attached to a ball screw spindle coupled with a ball screw nut. The ball screw spindle provides a reliable and simple linear actuation of a flow surface, while very high axial forces can be generated.

The drive system may further comprise a control unit couplable with the torque sensing device, wherein the control unit is designed to receive torque representing signals from the torque sensing device, and wherein the control unit is designed to determine a deviation between a measured torque and an expected torque and to generate a maintenance signal if the deviation exceeds a predetermined threshold. The control unit may be a part of an existing control unit in the form of an algorithm or it may be realized in the form of a separate, dedicated control unit. For example, the maintenance signal may be saved into a maintenance logbook or it may be transferred to a control station.

The invention further relates to a high lift system, having at least one movable flow body and a drive system according to the above, wherein the at least one movable flow body is coupled with the drive system, such that the drive system is operable to extend and retract the at least one movable flow body.

In an advantageous embodiment of the high lift system, the at least one movable flow body comprises at least one of a trailing edge flap and a leading edge flap or slat.

In a further embodiment the high lift system comprises a plurality of flow bodies in a symmetrical arrangement, the flow bodies being driven by a drive system each, wherein the torque sensing devices of the drive systems are couplable with a skew and loss detection computer of an aircraft. Hence, the torque sensing devices can be used for a skew detection. For instance, this task may be conducted by comparing measured load levels against expected load bevels either on one station or by comparing the values between two stations, i.e. flow bodies.

The invention further relates to a wing for an aircraft, comprising at least one high lift system according to the above, or a movable flow body coupled with a drive system according to the above.

The aircraft may have a wing according to the above and/or a high lift system according to the above.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical, or similar objects are identified by the same reference symbols in the figures.

DETAILED DESCRIPTION

Figure 1:
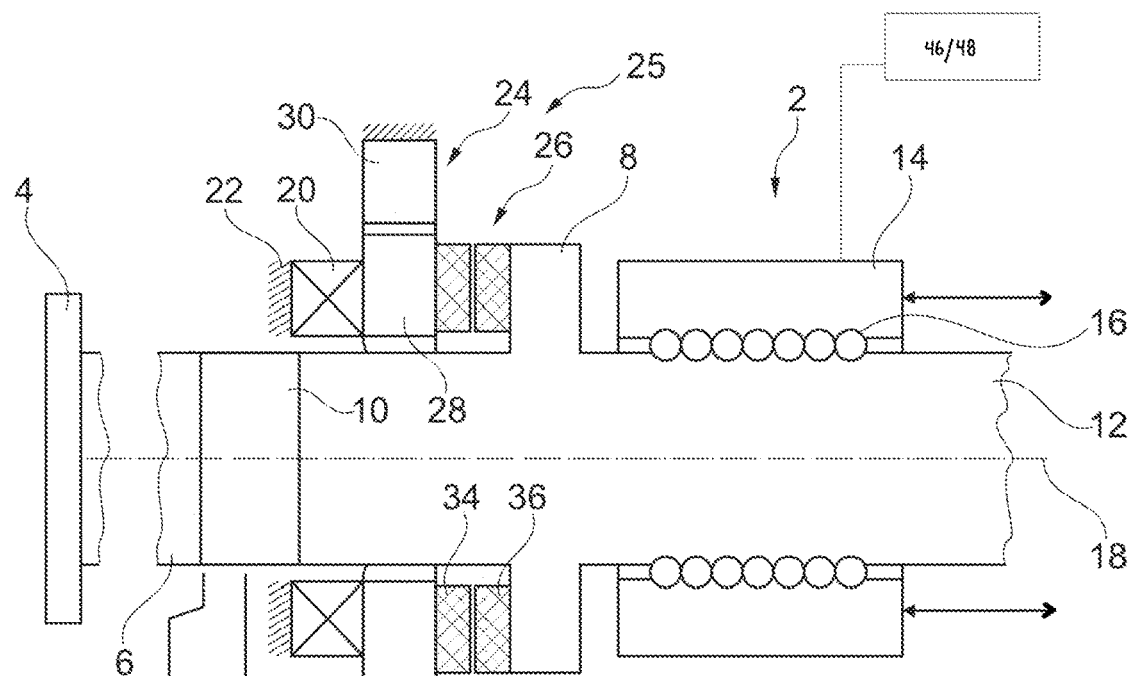
FIG. 1 shows a drive system in a schematic view.

FIG. 1 shows a drive system 2 in a schematic, block-oriented view. On the left side in the drawing plane, a drive unit 4 is indicated. This may be an electric motor, a hydraulic motor, a part of a transmission shaft system or any other device that is capable of introducing a rotation into the drive system 2. A shaft 6 is connected to the drive unit 4 and comprises an axial support means 8, wherein the axial support means 8 is a shoulder radially extending from the shaft 6. It is designed as a disc-like protrusion with a substantially rectangular cross-section. However, other variants and shapes are possible.

A load cell 10 is integrated into the shaft 6 and is capable of detecting a torque transferred from the drive unit 4 into the shaft 6. Here, the shaft 6 is a part of a ball screw spindle 12, or it may be connected thereto. A ball screw nut 14 is coupled with the ball screw spindle 12 through a plurality of balls 16. By rotating the shaft 6, the ball screw nut 14 can be moved along a longitudinal axis 18. Here, the ball screw nut 14 is coupled with a movable flow surface.

Forces induced by air loads acting onto the movable surface are transferred into the ball screw nut 14. For compensating these forces, and axial bearing 20 is provided, which rests on a structurally fixed surface 22. Between the axial support means 8 and the axial bearing 20, a no-back friction unit 25 having a one-way clutch 24 as a no-back device and a friction disc device 26 as a friction device are provided. The one-way clutch 24 comprises an inner clutch disc 28 and outer clutch ring 30. The outer clutch ring 30 is fixed to a structurally fixed part 32. The one-way clutch 24 is designed to let inner clutch ring 28 freely rotate in a first direction of rotation while it is blocked in an opposed second direction of rotation. In the second direction of rotation, it remains fixed relative to the outer clutch ring 30.

Between the inner clutch ring 28 and the axial support means 8, the friction disc device 26 is provided. Exemplarily it comprises a first friction disc 34 and a second friction disk 36. The first friction disc 34 is directly contacting the inner clutch ring 28 and is designed to rotate with it. For example, it may be glued or bolted thereto. The second friction disc 36 instead is connected to the axial support means 8, e.g. by gluing or bolting. The first friction disk 34 and the second friction disk 36 are capable of conducting a relative rotation. If the one-way clutch 24 is open, i.e. unblocked, the inner clutch ring 28 rotates the first friction disc 34, which in turn does not rotate relative to the second friction disk 36, as it rotates with the shaft 6. Thus, the friction disc device 26 does not provide any additional torque to the shaft 6 and the drive unit 4. For example, the first direction of rotation may be associated with an extension motion of the ball screw nut 14.

However, in the reverse direction of rotation, the one-way clutch 24 blocks and the inner clutch ring 28 cannot rotate relative to the outer clutch ring 30. However, by retracting the ball screw nut 14, the shaft 6 rotates in the second direction of rotation and also rotates the second friction disc 36. This leads to a relative rotation between the second friction disk 36 and the first friction disk 34 and generates a certain friction-induced torque, which is added to the torque required for moving the ball screw nut 14 on the ball screw spindle 12. The total torque including this additional torque is detectable by the load cell 10. If it does not detect an expected friction-induced additional torque, it may be interpreted as an unexpected behavior of the one-way clutch 24 or the friction disc device 26, which may lead to an inspection of the drive system 2.

For receiving sensor signals, a control unit 38 is exemplarily provided. The control unit 38 may be capable of receiving sensor signals and comparing the sensor signals or an associated torque with an expected torque.

Figure 2:
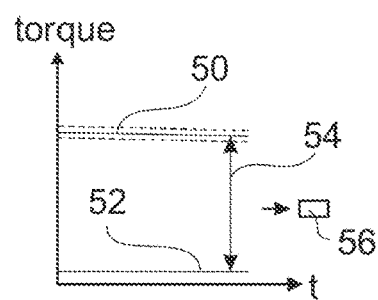
FIG. 2 shows a graph representing measured and expected torque.

FIG. 2 shows a schematic graph, in which an expected torque 50 over time is shown. In this graph, a measured torque 52 is clearly lower than the expected torque 50. Thus, a deviation 54 occurs. In this case, the deviation 54 exceeds a threshold indicate by dashed lines above and below the expected torque 50. As a result, a maintenance signal 56 is generated.

Figure 3:
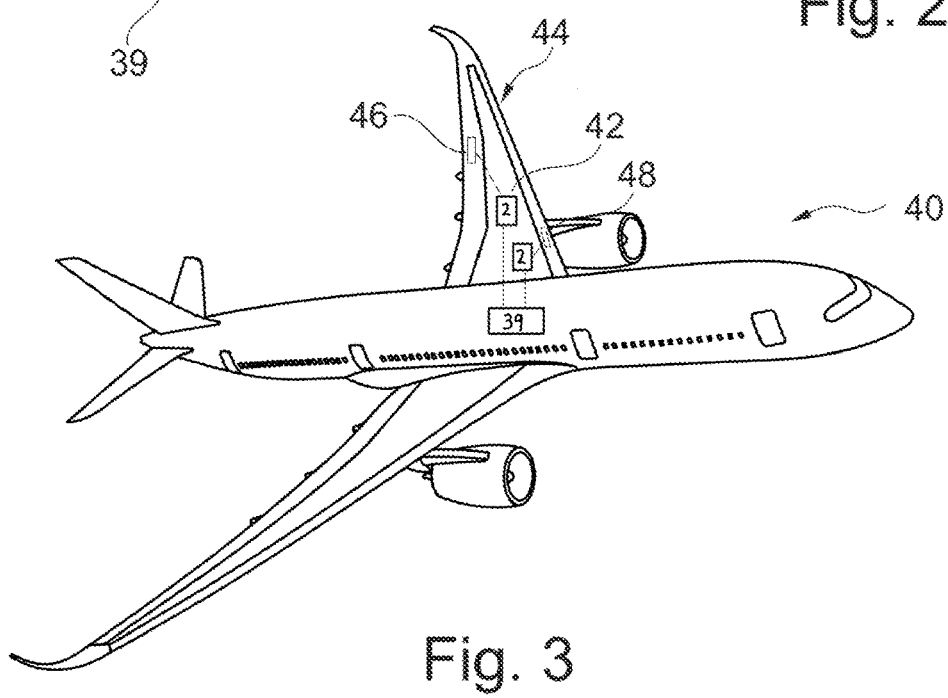
FIG. 3 shows an aircraft having a high lift system with such a drive system.

FIG. 3 shows an aircraft 40, which has a wing 42 with an integrated high lift system 44. The high lift system 44 exemplarily comprises movable trailing edge flaps 46 and leading edge slats 48. The trailing edge flaps 46 and/or the leading edge slats 48 are coupled with a drive system 2 to according to FIG. 1. The high lift system 44 may be realized without a common wing tip brake, as the one-way clutch 24 is checked every time the respective movable surfaces, such as trailing edge flap 46, is retracted. In the high lift system 44 a skew and loss detection computer 39 may be provided (see FIG. 1), which is connected to the torque sensing device 10 to be used for a skew detection.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A drive system for driving a movable flow body of an aircraft, comprising:
   a drive unit,
   a shaft having an axial support means,
   a torque sensing device,
   a no-back friction unit, and
   an axial bearing,
   wherein the drive unit is coupled with the shaft to rotate the shaft,
   wherein the torque sensing device is coupled with at least one of the drive unit and the shaft to detect a torque transferred from the drive unit into the shaft,
   wherein the no-back friction unit is disposed along a longitudinal axis of the drive system, entirely between the axial bearing and the axial support means of the shaft, such that an axial load of the shaft is supported by the axial bearing,
   wherein the no-back friction unit is configured to not counteract a rotation of the shaft in a first direction of rotation of the shaft and to apply a friction-induced additional torque to the shaft in an opposite second direction of rotation,
   wherein the no-back friction unit comprises a one-way clutch and a friction disc device having a first friction disc and a second friction disc in friction contact,
      wherein the one-way clutch and the friction disc device are designed to mutually rotate the first friction disc and the second friction disc with the one-way clutch in the first direction of rotation of the shaft, and to provide a relative rotation between the first friction disc and the second friction disc in the second direction of rotation.

2. The drive system according to claim 1, wherein the axial support means is a shoulder radially extending from the shaft.

3. The drive system according to claim 1, wherein the one-way clutch comprises an inner clutch ring and an outer clutch ring, wherein the inner clutch ring is arranged between the friction disc device and the axial bearing.

4. The drive system according to claim 3, wherein the outer clutch ring is couplable with a fixed structural part to be immovable.

5. The drive system according to claim 3, wherein the first friction disc is coupled with the inner clutch ring.

6. The drive system according to claim 1, wherein the torque sensing device is arranged adjacent to the no-back friction unit.

7. The drive system according to claim 1, further comprising a load cell integrated into the shaft.

8. The drive system according to claim 1, further comprising
a ball screw spindle coupled with a ball screw nut on the shaft.

9. The drive system according to claim 1, further comprising a control unit couplable with the torque sensing device,
wherein the control unit is designed to receive torque representing signals from the torque sensing device, and
wherein the control unit is designed to determine a deviation between a measured torque and an expected torque and to generate a maintenance signal if the deviation exceeds a predetermined threshold.

10. A high lift system, comprising
at least one movable flow body and
at least one drive system according to claim 1,
wherein the at least one movable flow body is configured to be coupled with the respective one of the at least one drive system, such that the respective one of the at least one drive system is operable to extend and retract the at least one movable flow body.

11. The high lift system according to claim 10, wherein the at least one movable flow body comprises at least one of a trailing edge flap and a slat.

12. The high lift system according to claim 10, the at least one movable flow body is a plurality of movable flow bodies in a symmetrical arrangement, and the at least one drive system is a plurality of drive systems, wherein the plurality of the flow bodies are driven by a respective of the at least one drive system each, wherein the torque sensing devices of the drive systems are configured to couple with a skew and loss detection computer of an aircraft.

13. A wing for an aircraft, comprising at least one high lift system according to claim 10.

14. An aircraft, comprising a wing according to claim 13.

15. A wing for an aircraft, comprising a movable flow body coupled with a drive system according to claim 1.

16. An aircraft, comprising a high lift system according to claim 10.

* * * * *